US012188275B2

(12) United States Patent
Gabl et al.

(10) Patent No.: US 12,188,275 B2

(45) Date of Patent: Jan. 7, 2025

(54) FURNITURE DRIVE FOR MOVING A FURNITURE FRONT PART

(71) Applicant: Julius Blum GmbH, Hoechst (AT)

(72) Inventors: Dominik Gabl, Bludenz (AT); Jose Christian Donayre Ramirez, Hoechst (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/133,706

(22) Filed: Apr. 12, 2023

(65) Prior Publication Data

US 2023/0243196 A1 Aug. 3, 2023

Related U.S. Application Data

(63) Continuation of application No. PCT/AT2021/060379, filed on Oct. 15, 2021.

(30) Foreign Application Priority Data

Oct. 22, 2020 (AT) .............................. A 50911/2020

(51) Int. Cl.

*E05F 1/08* (2006.01)
*E05D 3/14* (2006.01)
*E05F 1/12* (2006.01)

(52) U.S. Cl.

CPC .................. *E05D 3/14* (2013.01); *E05F 1/12* (2013.01); *E05Y 2900/20* (2013.01)

(58) Field of Classification Search

CPC ... E05F 1/08; E05F 1/10; E05F 1/1041; E05F 1/1091; E05F 1/12; E05F 1/1223;

(Continued)

(56) References Cited

U.S. PATENT DOCUMENTS 6,574,835 B2 6/2003 Melhuish
6,877,830 B2 4/2005 Salice (Continued)

FOREIGN PATENT DOCUMENTS

DE 20 2005 018 350 2/2006
EP 1 785 567 5/2007

(Continued)

OTHER PUBLICATIONS

International Search Report issued Jan. 14, 2022 in International (PCT) Application No. PCT/AT2021/060379.

*Primary Examiner* — Chuck Y Mah

(74) *Attorney, Agent, or Firm* — Wenderoth, Lind & Ponack, L.L.P.

(57) ABSTRACT

A furniture drive includes a main part and an actuator arm rotatably mounted on the main part about a first rotational axis. The actuator arm has multiple levers, and a securing interface arranged on an imaginary securing interface plane and via which the furniture front part can be secured to the actuator arm. The actuator arm can be moved continuously with respect to the first rotational axis between a first rotational position, which corresponds to a closed position of the furniture front part that can be secured to the actuator arm and which can be assigned a rotational angle $\alpha$ of 0°, and a second rotational position, which corresponds to a maximum open position of the furniture front part that can be secured to the actuator arm and which can be assigned a rotational angle $\alpha$ greater than 0°.

28 Claims, 9 Drawing Sheets

(58) Field of Classification Search
CPC ..... E05F 1/1246; E05F 1/1253; E05F 1/1261; E05F 1/1292; E05F 1/14; E05F 3/20; E05F 3/18; E05D 11/1021; E05D 3/12; E05D 3/14; E05D 3/16; E05D 11/10; E05D 15/40; E05D 15/401; E05D 15/405; E05D 15/406; E05D 15/42; E05D 15/58; E05D 15/565; E06B 3/5045; E05Y 2800/22; E05Y 2900/20; E05Y 2900/202; E05Y 2900/208; E05Y 2900/21; E05Y 2201/21; E05Y 2201/264; E05Y 2201/212; E05Y 2201/604
See application file for complete search history.

(56) References Cited

U.S. PATENT DOCUMENTS

| | | | | |
|---|---|---|---|---|
| 7,178,202 | B2 * | 2/2007 | Hirtsiefer | E05D 15/46 16/366 |
| 7,976,079 | B2 * | 7/2011 | Hirtsiefer | E05D 15/463 292/262 |
| 10,246,915 | B2 | 4/2019 | Brunnmayr | |
| 11,350,747 | B2 | 6/2022 | Poppenborg | |
| 2002/0108311 | A1 | 8/2002 | Salice | |
| 2002/0189052 | A1 | 12/2002 | Melhuish | |
| 2007/0124893 | A1 * | 6/2007 | Brustle | E05F 5/02 16/296 |
| 2009/0072551 | A1 | 3/2009 | Hirtsiefer | |
| 2010/0229672 | A1 * | 9/2010 | Brunnmayr | E05D 15/46 74/490.07 |
| 2012/0084944 | A1 * | 4/2012 | Hirtsiefer | E05D 15/46 16/349 |
| 2013/0031746 | A1 * | 2/2013 | Hasegawa | E05F 5/027 16/50 |
| 2017/0328103 | A1 | 11/2017 | Brunnmayr | |
| 2018/0363348 | A1 * | 12/2018 | Schluge | E05F 1/1058 |
| 2019/0242167 | A1 * | 8/2019 | Salice | E05F 1/1058 |
| 2019/0380496 | A1 | 12/2019 | Poppenborg | |
| 2020/0224477 | A1 * | 7/2020 | Sobolewski | E05F 1/1075 |
| 2021/0189780 | A1 * | 6/2021 | Nordieker | E05D 7/0415 |
| 2021/0404230 | A1 * | 12/2021 | Giovannetti | E05F 1/1261 |
| 2022/0307309 | A1 * | 9/2022 | Hirtsiefer | E05F 5/10 |

FOREIGN PATENT DOCUMENTS

| | | |
|---|---|---|
| EP | 2 093 361 | 8/2009 |
| EP | 2 176 484 | 2/2011 |
| HU | 223 555 | 9/2004 |
| JP | 7-11829 | 1/1995 |
| JP | 2013-87602 | 5/2013 |
| WO | 2017/143378 | 8/2017 |

* cited by examiner

Fig. 1a - PRIOR ART
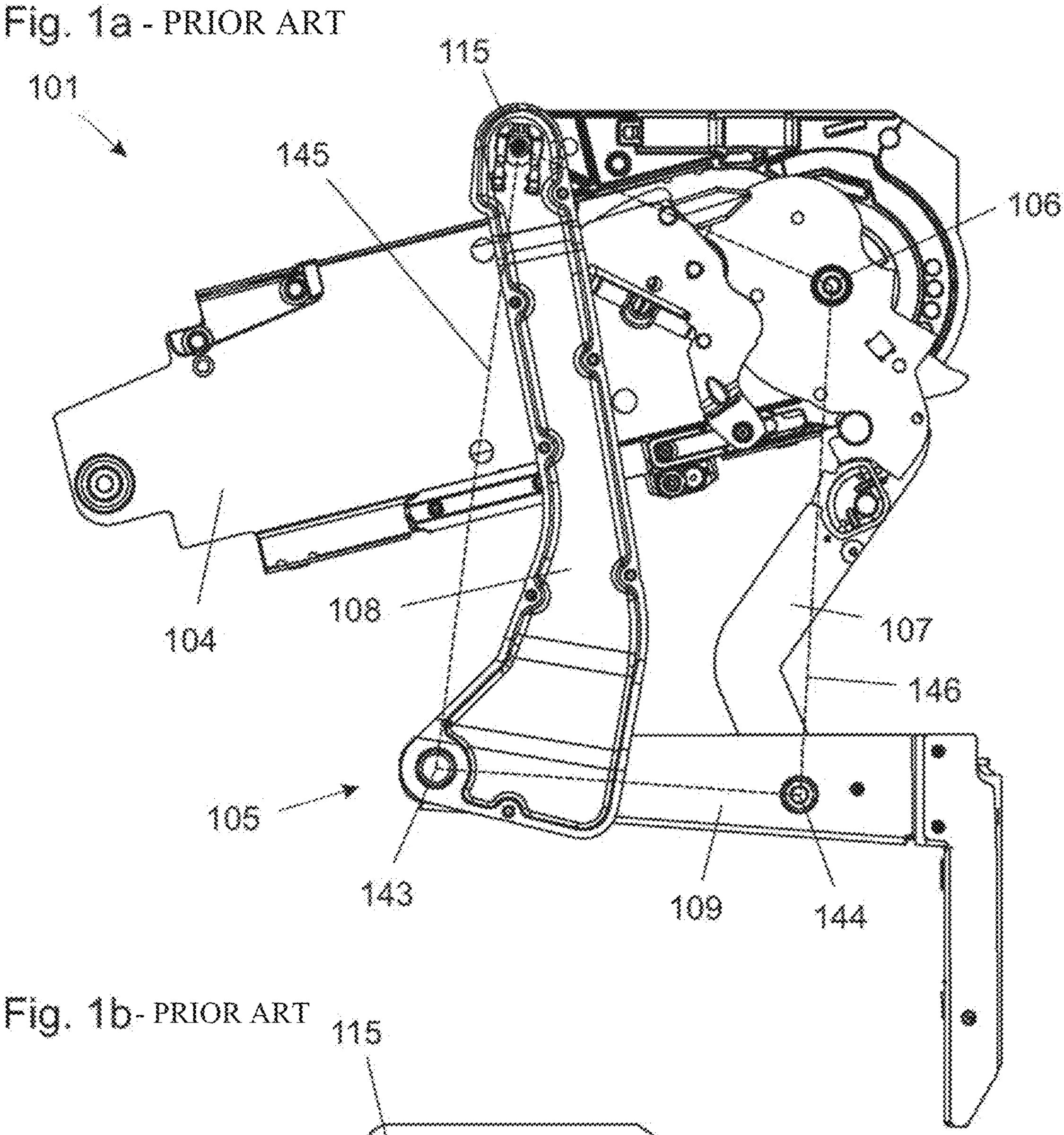
Fig. 1b- PRIOR ART
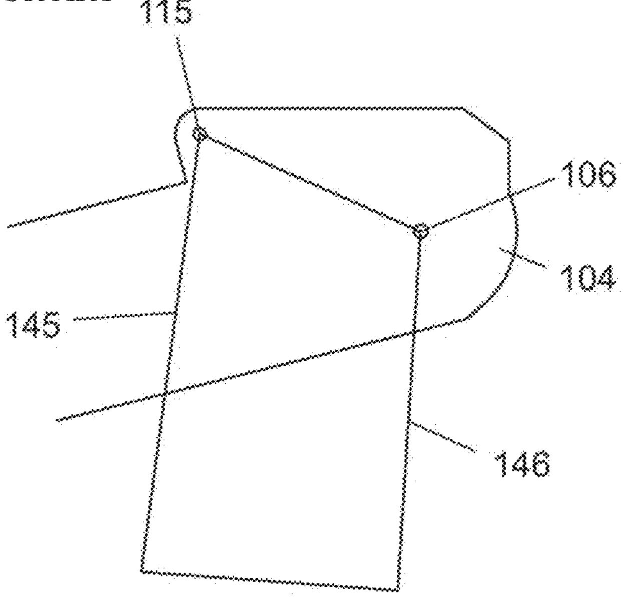

FURNITURE DRIVE FOR MOVING A FURNITURE FRONT PART

BACKGROUND OF THE INVENTION

The invention relates to a furniture drive for moving a furniture front part relative to a furniture carcass. The invention furthermore relates to a piece of furniture comprising a furniture carcass, a furniture front part and at least one such furniture drive. And finally, the invention relates to a method for moving a furniture front part relative to a furniture carcass of such a piece of furniture.

FIGS. 1*a* and 1*b* show a furniture drive 101 according to the state of the art in a top view from the side. The furniture drive 101 comprises a main body 104 that can be fastened to a furniture carcass and an actuating arm 105, which is mounted rotatable about a first axis of rotation 106 and a second axis of rotation 115 on the main body 104. The actuating arm 105 has several levers 107, 108 and 109 connected to each other in an articulated manner, wherein levers 107 and 109 are connected to each other via a pivot point 144 and levers 108 and 109 are connected to each other via a pivot point 143. Levers 107, 108 and 109 form two effective lever arms 145 and 146, which run between the pivot points 115 and 143 on one side and 106 and 144 on the other side. Partial FIG. 1*b* shows an abstracted schematic representation of lever arms 145 and 146.

A disadvantage of this furniture drive according to the state of the art is that, when the furniture drive is used in a furniture carcass together with a further furniture drive in order to move a furniture front part relative to the furniture carcass, it needs to be coupled to the further furniture drive via a synchronization rod in order to synchronize a rotational movement of the actuating arms with each other and thus stabilize the system composed of the two furniture drives and the furniture front part. Without the synchronization rod, the system would be in an unstable state in particular at the beginning of the opening movement of the furniture front part.

However, the synchronization rod is also problematic because it takes up part of the interior which should actually be available as storage space for items to be stowed. Moreover, the synchronization rod is not very aesthetically appealing.

SUMMARY OF THE INVENTION

The object of the present invention is to specify a furniture drive that is improved compared with the state of the art, a piece of furniture with a furniture drive improved in such a way and a method for moving a furniture front part relative to a furniture carcass of such a piece of furniture, in which the above-described disadvantages are remedied, wherein in particular the use of a synchronization rod can be dispensed with and a stable system composed of two furniture drives and a furniture front part can nevertheless be realized.

In the furniture drive according to the invention, the levers of the actuating arm are arranged relative to one another such that a gradient $f'(\alpha)$ of the function f is greater than 0.2, preferably greater than 0.3, at least over a rotational angle range of the actuating arm between 0° and 25°, preferably over the whole rotational angle range of the actuating arm.

The invention is based on the finding that, starting from a threshold value of the gradient $f'(\alpha)$ of the function f, a furniture drive can be realized which has a sufficiently high stability in particular at the beginning of the opening movement, with the result that, in the case of an arrangement composed of two furniture drives which are used in a piece of furniture to move a furniture front part relative to a furniture carcass, an additional synchronization mechanism can be dispensed with. Below this threshold value the arrangement is unstable, as is known from the state of the art, above the threshold value the arrangement is stable.

This set of facts is further illustrated in the course of the description of the figures with reference to FIGS. 6*a* and 6*b*.

According to a preferred embodiment, the levers of the actuating arm form a four-pivot point geometry, wherein one of the four pivot points of the four-pivot point geometry corresponds to the at least one first axis of rotation of the actuating arm. The four pivot points of the four-pivot point geometry of the levers of the actuating arm are arranged relative to one another such that a gradient $f'(\alpha)$ of the function f is greater than 0.2, preferably greater than 0.3, at least over a rotational angle range of the actuating arm between 0° and 25°, preferably over the whole rotational angle range of the actuating arm. Furniture drives with such a four-pivot point geometry are particularly suitable for implementing a pivoting-up movement of a furniture front part relative to a furniture carcass about at least one horizontal axis.

Alternatively or additionally, it has proved to be advantageous for the actuating arm to be mounted rotatable about at least one second axis of rotation on the main body, wherein the main body of the furniture drive has a front opening through which the actuating arm protrudes at least in areas at least in the maximum open position. The second axis of rotation has a smaller normal distance from the front opening than the first axis of rotation, and/or the main body of the furniture drive has a top side which faces a top panel of the furniture carcass when the furniture drive is fastened to the furniture carcass. The second axis of rotation has a smaller normal distance from the top side than the first axis of rotation. In comparison to that, the second axis of rotation 115 of the furniture drive 101 according to FIG. 1*a*, known from the state of the art, has a larger normal distance from the front opening.

In this connection, with a four-pivot point geometry of the levers of the actuating arm, it has also proved to be advantageous for the second axis of rotation to correspond to a pivot point of the four-pivot point geometry.

Further advantageous embodiments are characterized by the fact that the actuating arm comprises at least three levers connected to each other in an articulated manner, and/or comprises at least one angled lever, preferably wherein two sections of the angled lever form an angle of substantially 90° relative to one another, and/or at least two of the provided levers of the actuating arm are arranged nested in one another in at least one rotational position, preferably in every rotational position, of the actuating arm, with the result that the two levers are formed substantially gap-free in a top view from the side, and/or at least one lever is formed U-shaped in a cross section and a further lever can be arranged or is arranged between the vertical bars of the U shape at least in sections. The nested arrangement and/or the arrangement in sections within the U shape make it possible in particular to form the actuating arm symmetrical with respect to an imaginary center plane, as a result of which the same actuating arm and thus the whole furniture drive can be used irrespective of the side wall of a furniture carcass in and/or to which the furniture drive is fastened.

A technically simple and at the same time stable lever arrangement can be achieved in that the actuating arm has at least one first lever and one second lever, via which the actuating arm is rotatably connected to the main body, and at least one third lever, on which the fastening interface is formed, wherein the first lever and the second lever are connected to the third lever in an articulated manner.

The installation of a furniture front part on a furniture carcass can be greatly simplified in that at least one, preferably at least two, of the levers of the actuating arm can be detachably connected to the main body of the furniture drive.

It has proved to be advantageous for the furniture drive to have at least one energy storage mechanism, preferably having at least one spring element and preferably mounted on the main body, via which a force can be applied to the actuating arm in order to compensate for a weight of the furniture front part that can be fastened to the actuating arm.

In this connection, it makes sense for a transfer mechanism to be provided, with which a force that can be stored in the at least one energy storage mechanism can be transferred to the actuating arm. Preferably, the transfer mechanism comprises at least one intermediate lever, and the at least one energy storage mechanism is connected to the at least one intermediate lever via a preferably adjustable force linkage point, and/or comprises at least one pressure piece and at least one positioning contour, on which the at least one pressure piece can be displaceably supported. Preferably, the at least one pressure piece is arranged on at least one intermediate lever of the transfer mechanism and the at least one positioning contour is arranged on the actuating arm, or vice versa.

As stated at the beginning, protection is also sought for a piece of furniture comprising a furniture carcass, a furniture front part and at least one furniture drive according to the invention. The main body of the at least one furniture drive is fastened to the furniture carcass, preferably in and/or on a side wall of the furniture carcass, and the furniture front part is fastened to the actuating arm of the at least one furniture drive via the fastening interface.

The advantages of the furniture drive according to the invention come into effect above all when the piece of furniture comprises at least one further furniture drive connected to the furniture carcass and the furniture front part, wherein the two furniture drives are connected to each other only via the furniture front part and the furniture carcass, this means that a synchronization mechanism separate from the furniture front part, such as e.g. a synchronization rod known from the state of the art, can be dispensed with.

An advantageous embodiment of the piece of furniture is characterized by the fact that an instantaneous center of rotation of the furniture front part or of the lever arrangement of the levers of the actuating arm can be moved along an imaginary curve in space relative to the furniture carcass when the furniture front part is moved between the closed position and the maximum open position. The furniture carcass has a top panel, and an end point of the curve of the instantaneous center of rotation, which corresponds to the closed position, is less than 500 mm, preferably less than 250 mm, away from the top side of the top panel, and/or the furniture carcass has a front face that faces the furniture front part in the closed position, and an end point of the curve of the instantaneous center of rotation, which corresponds to the closed position, is less than 75 mm, preferably less than 50 mm, away from an imaginary extension of the front face upwards beyond the furniture carcass.

In the case of a planar movement of a rigid body, the instantaneous center of rotation is that point in space about which the body can be regarded as only rotating at that instant. In the case of a planar movement of a rigid body with a translational movement and a rotary movement, these are combined into a pure rotational movement about the pivot point at that instant, which is referred to as the instantaneous center of rotation.

During the movement of the furniture front part, the instantaneous center of rotation changes further in every covered position. If these positions are determined, the result is a path in relation to a space-fixed reference system, in the present case to the stationary furniture carcass, on which the instantaneous center of rotation runs. The instantaneous center of rotation of the furniture front part can be determined for every arbitrary point of the furniture front part or also for points of other component parts which are connected to the furniture front part.

With reference to the lever arrangement of the levers of the actuating arm in the case of a four-pivot point geometry, the instantaneous center of rotation can be determined as the point of intersection of the two effective lever arms.

It has now been proved that a particularly stable system can be achieved when the instantaneous center of rotation is arranged as close as possible to the fixed pivot points of the furniture drive, in particular at the beginning of the opening movement. The smaller the distance of the mentioned end point of the curve is from the instantaneous center of rotation, the more rigid and more stable is the arrangement that can be realized with the furniture drive. This set of facts is explained in even more detail in the course of the description of the figures with reference to FIGS. 10*a* and 10*b*.

Preferably, the furniture carcass comprises a cornice, wherein, in the case of a movement between the closed position and the maximum open position, the furniture front part can be moved unhindered around the cornice without an upper edge of the furniture front part that faces the cornice in the closed position colliding with the cornice, preferably wherein the furniture carcass has a top panel, and a top side of the cornice is between 75 and 100 mm away from the top side of the top panel, and/or the furniture carcass has a front face that faces the furniture front part in the closed position, and a front side of the cornice is between 40 and 75 mm away from an imaginary extension of the front face upwards beyond the furniture carcass.

It makes sense for the furniture carcass to have a front face that faces the furniture front part in the closed position, wherein, in the closed position, the furniture front part has a front part angle $\beta$ of 0° relative to the front face, preferably wherein, in the maximum open position, the furniture front part has a front part angle $\beta$ of between 60° and 80° relative to the front face.

Quite apart from the threshold value defined for the gradient $f'(\alpha)$ of the function f, no piece of furniture is known from the state of the art which comprises a furniture carcass, a furniture front part and at least one furniture drive in which the main body of the at least one furniture drive is fastened to the furniture carcass, preferably in and/or on a side wall of the furniture carcass, and the furniture front part is fastened to the actuating arm of the at least one furniture drive via the fastening interface. An instantaneous center of rotation of the furniture front part or of the lever arrangement of the levers of the actuating arm can be moved along an imaginary curve in space relative to the furniture carcass when the furniture front part is moved between the closed position and the maximum open position, in which the furniture carcass has a top panel, and an end point of the curve of the instantaneous center of rotation, which corresponds to the closed position, is less than 500 mm, preferably less than 250 mm, away from the top side of the top panel, and/or the furniture carcass has a front face that faces the furniture front part in the closed position, and an end point of the curve of the instantaneous center of rotation, which corresponds to the closed position, is less than 75 mm, preferably less than 50 mm, away from an imaginary extension of the front face upwards beyond the furniture carcass, and wherein the furniture carcass comprises a cornice and, in the case of a movement between the closed position and the maximum open position, the furniture front part can be moved unhindered around the cornice without an upper edge of the furniture front part that faces the cornice in the closed position colliding with the cornice, preferably wherein the furniture carcass has a top panel, and a top side of the cornice is between 75 and 100 mm away from the top side of the top panel, and/or the furniture carcass has a front face that faces the furniture front part in the closed position, and a front side of the cornice is between 40 and 75 mm away from an imaginary extension of the front face upwards beyond the furniture carcass.

According to an advantageous embodiment, the piece of furniture has at least one further furniture drive connected to the furniture carcass and the furniture front part, wherein the two furniture drives are connected to each other only via the furniture front part and the furniture carcass.

And finally, protection is sought for a method for moving a furniture front part relative to a furniture carcass of a piece of furniture according to the invention, wherein the furniture front part is moved, starting from a closed position, in the direction of a maximum open position, and vice versa, preferably wherein the furniture carcass comprises a cornice and, in the case of a movement between the closed position and the maximum open position, the furniture front part is moved unhindered around the cornice without an upper edge of the furniture front part that faces the cornice in the closed position colliding with the cornice.

BRIEF DESCRIPTION OF THE DRAWINGS

Further details and advantages of the invention are explained in more detail below by means of the description of the figures with reference to the drawings, in which:

FIGS. 1*a*, 1*b* show a furniture drive according to the state of the art in a top view from the side, wherein partial figure b shows an abstracted schematic representation of the lever arms.

DETAILED DESCRIPTION OF THE INVENTION

FIGS. 1*a* and 1*b*, which show a furniture drive 101 according to the state of the art, have already been described at the beginning.

Figure 2A:
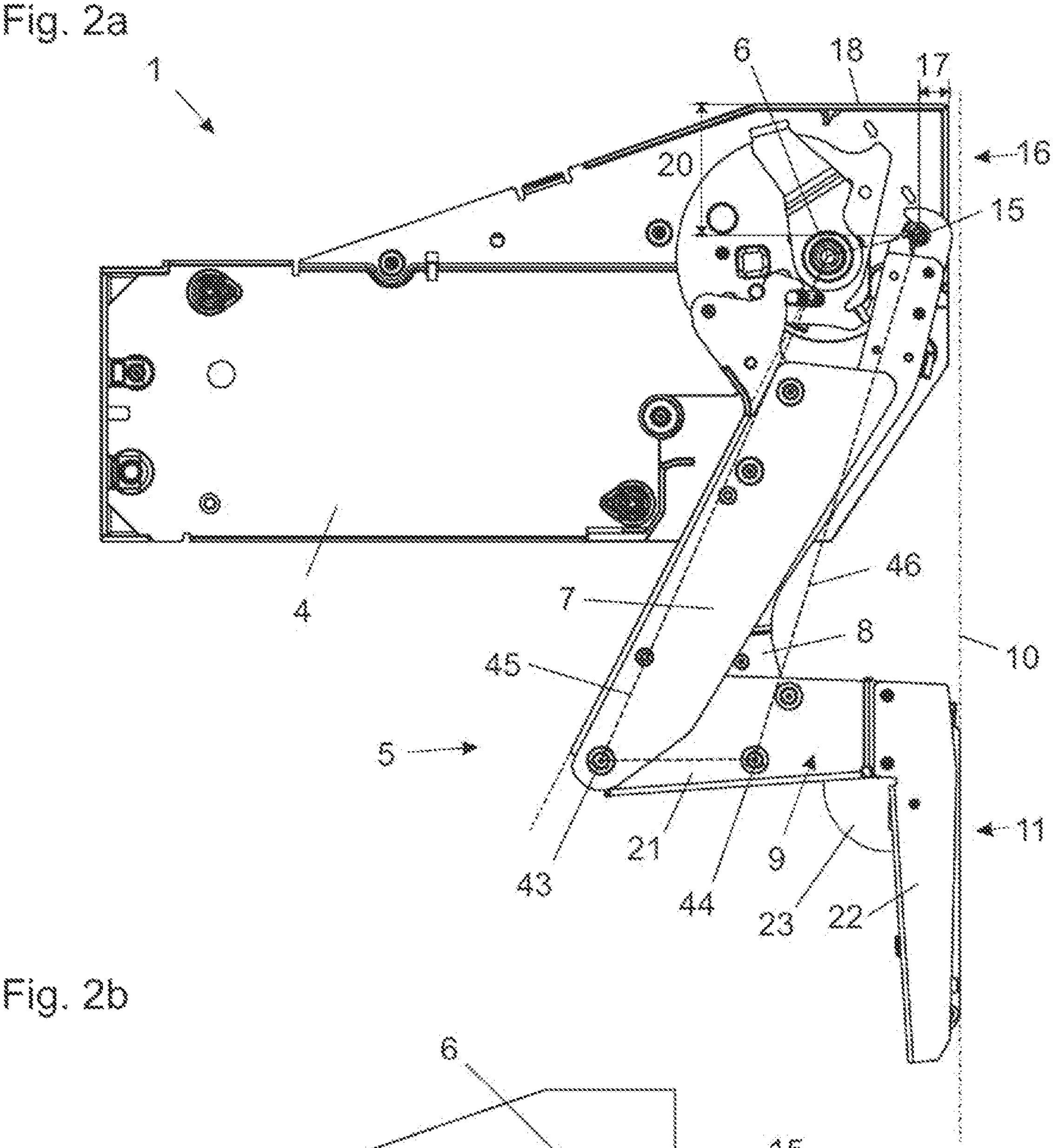
FIGS. 2*a*, 2*b* show an embodiment of a furniture drive according to the invention in a top view from the side, wherein partial figure b shows an abstracted schematic representation of the lever arms.
Figure 2B:
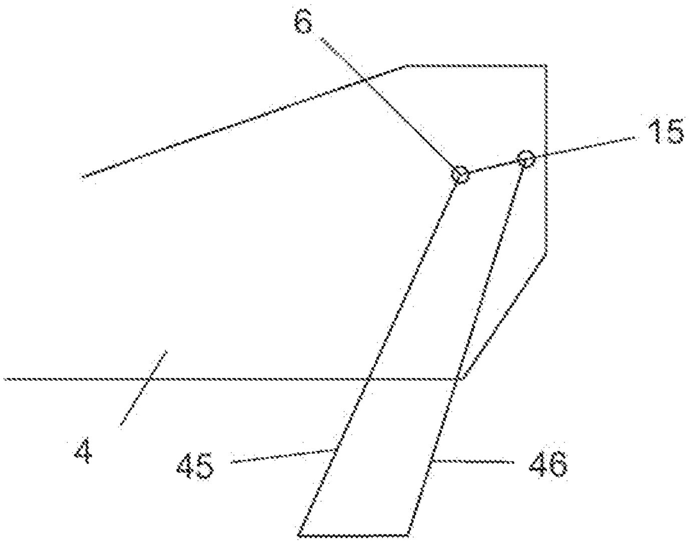

In comparison to that, FIGS. 2*a* and 2*b* show an embodiment of a furniture drive 1 according to the invention for moving a furniture front part 2 relative to a furniture carcass 3 (see also the following FIG. 3), comprising a main body 4 that can be fastened to the furniture carcass 3 and an actuating arm 5, which is mounted rotatable about at least one first axis of rotation 6 on the main body 4.

The actuating arm 5 has several levers 7, 8, 9 connected to each other in an articulated manner.

The actuating arm 5 has a fastening interface 11 arranged in an imaginary fastening interface plane 10 via which the furniture front part 2 can be fastened to the actuating arm 5. The fastening interface plane 10 is indicated by means of a dot-dashed line.

Figure 5A:
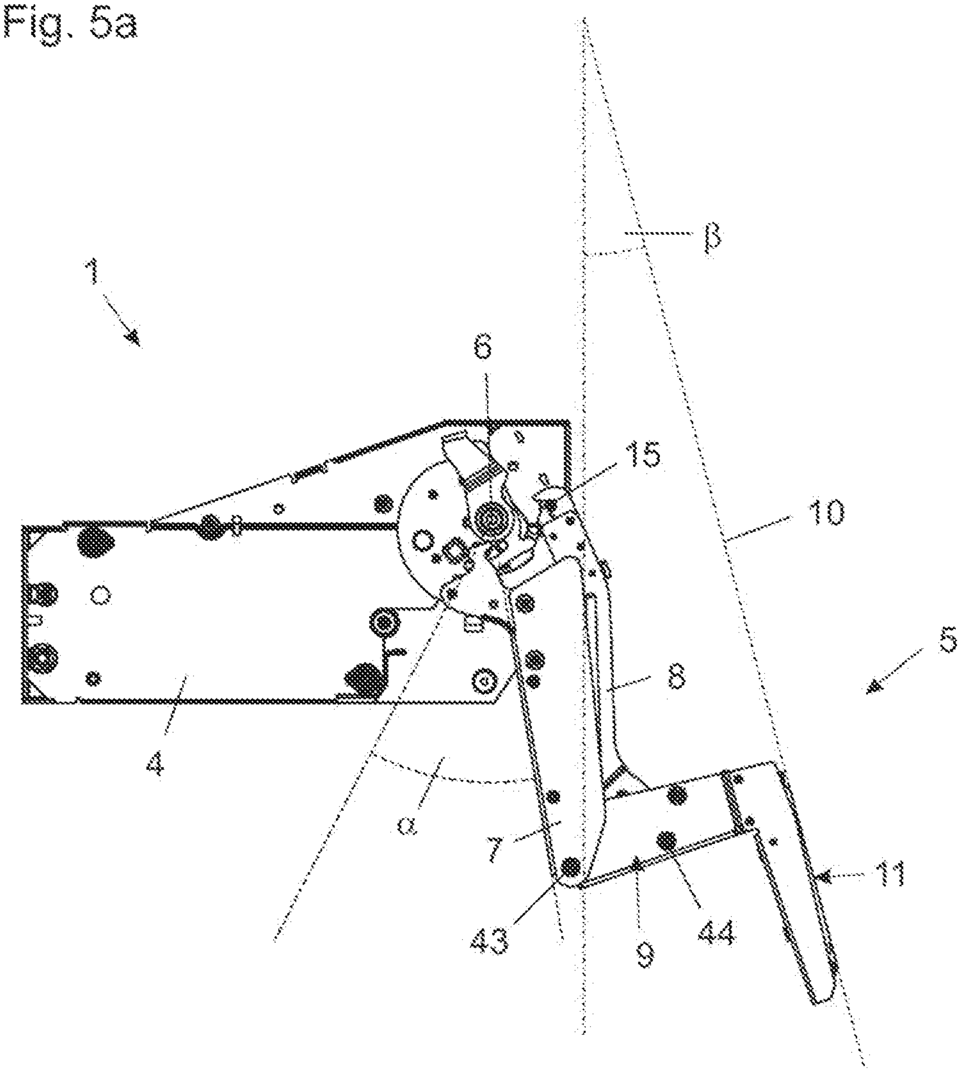
FIGS. 5*a*-5*e* show the embodiment of the furniture drive according to the invention, wherein the actuating arm is arranged in different rotational positions relative to the main body, between a first rotational position, which corresponds to a closed position of the furniture front part that can be fastened to the actuating arm (partial figure a), and a second rotational position, which corresponds to a maximum open position of the furniture front part that can be fastened to the actuating arm (partial figure e)

The actuating arm 5 can be moved continuously with respect to the at least one first axis of rotation 6 between a first rotational position and a second rotational position. The first rotational position corresponds to a closed position of the furniture front part 2 that can be fastened to the actuating arm 5 (and, particularly, the position of the first lever 7 when the fastening interface 11 and furniture front part 2 are in the closed position), and can be assigned a rotational angle $\alpha$ of 0°. The second rotational position corresponds to a maximum open position of the furniture front part 2 that can be fastened to the actuating arm 5 (and, particularly, the position of the first lever 7 when the fastening interface 11 and furniture front part 2 are in the maximum open position) and can be assigned a rotational angle α greater than 0°. The left-hand edge, in the figure, of the first lever 7 which is marked with a dashed line can be used, for example, as reference for the measurement of the rotational angle α. However, the rotational angle α can also be determined in relation to another axis of rotation and/or in relation to another reference. The rotational angle α is drawn in by way of example in FIG. 5*a*.

During a rotational movement of the actuating arm 5, the fastening interface plane 10, and thus the furniture front part 2 that can be fastened to the actuating arm 5, passes through different front part angles β. The front part angle β is drawn in by way of example in FIG. 5*a*, and is the angle between a front face 37 of the furniture carcass 3 (see FIG. 3) and the fastening interface plane 10.

Each rotational angle α of the actuating arm 5 can be assigned a front part angle β=f (α) of the fastening interface plane 10 using a function f, beginning with a front part angle β of 0°, which can be assigned to the rotational angle α of the actuating arm 5 of 0°.

In the embodiment represented, levers 7, 8, 9 of the actuating arm 5 form a four-pivot point geometry, wherein one of the four pivot points of the four-pivot point geometry corresponds to the at least one first axis of rotation 6 of the actuating arm 5.

The actuating arm 5 is mounted rotatable about at least one second axis of rotation 15 on the main body 4, and the main body 4 of the furniture drive 1 has a front opening 16 through which the actuating arm 5 protrudes at least in areas at least in the maximum open position. The second axis of rotation 15 is located a smaller normal distance 17 from the front opening 16 than is the first axis of rotation 6, and the main body 4 of the furniture drive 1 has a top side 18 which faces a top panel 19 of the furniture carcass 3 when the furniture drive 1 is fastened to the furniture carcass 3. The second axis of rotation 15 is located a smaller normal distance 20 from the top side 18 than is the first axis of rotation 6.

The second axis of rotation 15 corresponds to a pivot point of the four-pivot point geometry of the levers 7, 8, 9 of the actuating arm 5.

Compared with the furniture drive 101 according to FIGS. 1*a* and 1*b* known from the state of the art, the distance between the two axes of rotation 6 and 15 of the furniture drive 1 is much smaller than the distance between the two axes of rotation 106 and 115 of the furniture drive 101.

The actuating arm 5 comprises three levers 7, 8, 9 connected to each other in an articulated manner including one angled lever 9, wherein two sections 21, 22 of the angled lever 9 form an angle 23 of substantially 90° relative to one another.

Two of the provided levers 7, 8, 9 of the actuating arm 5, namely levers 7 and 8, are arranged nested in one another in at least one rotational position of the actuating arm 5, with the result that the two levers 7, 8 are formed substantially gap-free in a top view from the side. The first lever 7 is formed U-shaped in a cross section, and a second lever 8 can be arranged or is at least partially arranged between the vertical bars (legs) of the U shape.

The actuating arm 5 has the first lever 7 and the second lever 8, via which the actuating arm 5 is rotatably connected to the main body 4, and the third lever 9, on which the fastening interface 11 is formed. The first lever 7 and the second lever 8 are connected to the third lever 9 in an articulated manner. For this, a first pivot point 43, which connects levers 7 and 9, and a second pivot point 44, which connects levers 8 and 9, are provided.

The two levers 7 and 8 of the actuating arm 5 can be detachably connected to the main body 4 of the furniture drive 1.

In FIG. 2*b*, the position of the two effective lever arms 45 and 46 relative to the main body 4 is again represented in the first rotational position of the actuating arm 5, i.e. the closed position.

Figure 3:
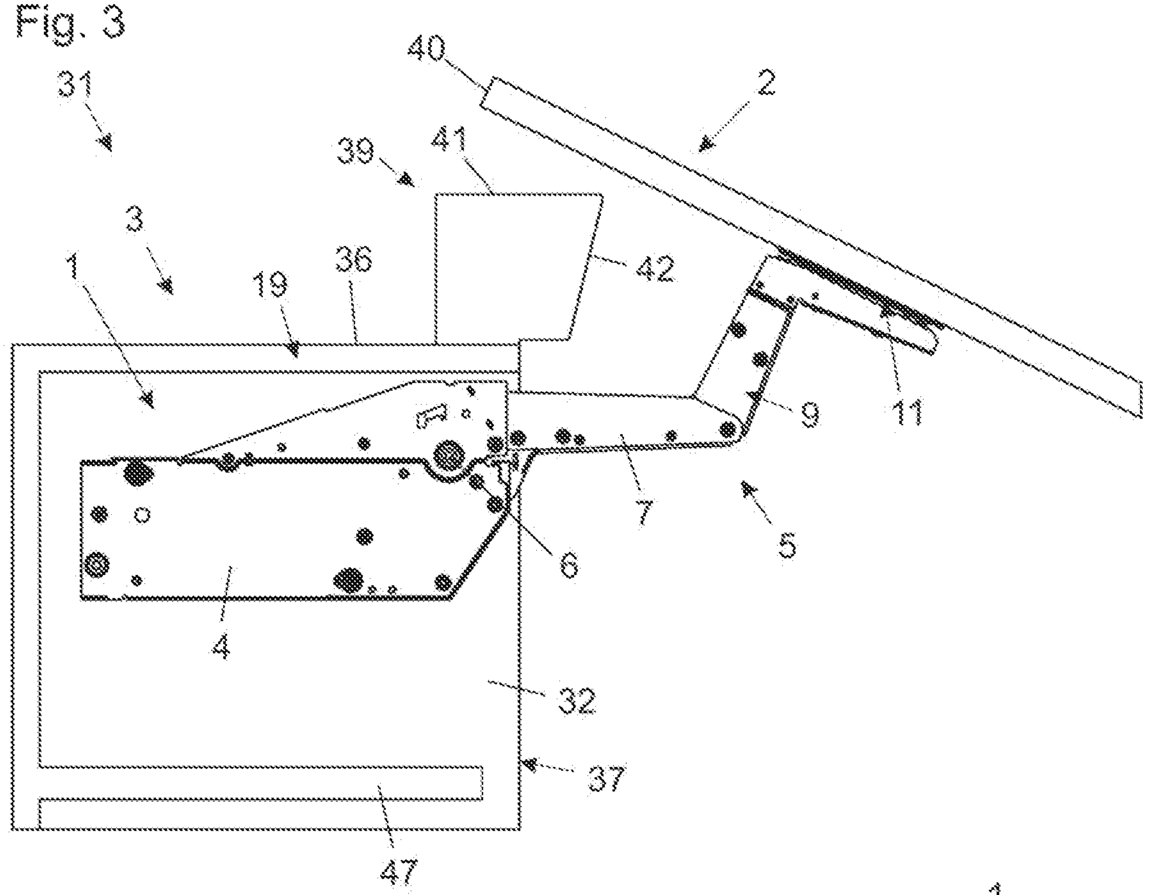
FIG. 3 shows an embodiment of a piece of furniture with a furniture drive according to the invention in a schematic cross-sectional view from the side.

FIG. 3 shows an embodiment of a piece of furniture 31 with a furniture drive 1. The piece of furniture 31 comprises a furniture carcass 3, a furniture front part 2 and at least one furniture drive 1. The main body 4 of the furniture drive 1 is fastened to the furniture carcass 3, preferably in and/or on a side wall 32 of the furniture carcass 3, and the furniture front part 2 is fastened to the actuating arm 5 of the at least one furniture drive 1 via the fastening interface 11.

The piece of furniture 31 can also comprise at least one further furniture drive 1 connected to the furniture carcass 3 and the furniture front part 2, wherein the two furniture drives 1 are connected to each other only via the furniture front part 2 and the furniture carcass 3.

The furniture carcass 3 has a front face 37 that faces the furniture front part 2 in the closed position. In the closed position, the furniture front part 2 has a front part angle β of 0° relative to the front face 37, while in the maximum open position, the furniture front part 2 has a front part angle β of between 60° and 80° relative to the front face 37. This maximum open position is represented in FIG. 3.

In addition to a top panel 19, the piece of furniture 31 can also comprise a shelf 47 and/or a cornice 39.

Figure 4:
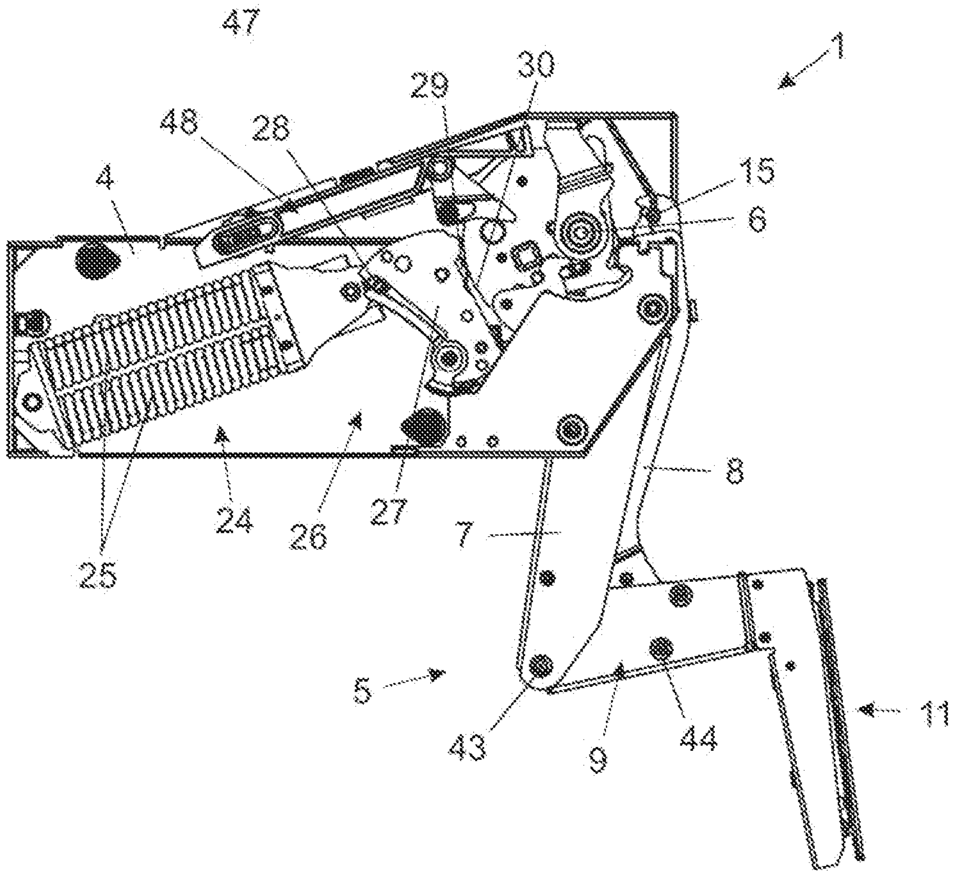
FIG. 4 shows the embodiment of the furniture drive according to the invention with an open casing.

FIG. 4 shows the embodiment of the furniture drive 1 with an open casing, with the result that the inner workings of the furniture drive 1 can be seen.

The furniture drive 1 can have at least one energy storage mechanism 24, preferably having at least one spring element 25 and preferably mounted on the main body 4, via which a force can be applied to the actuating arm 5 in order to compensate for a weight of the furniture front part 2 that can be fastened to the actuating arm 5.

As in the represented case, a transfer mechanism 26 can be provided, with which a force that can be stored in the at least one energy storage mechanism 24 can be transferred to the actuating arm 5. The transfer mechanism 26 comprises at least one intermediate lever 27, and the at least one energy storage mechanism 24 is connected to the at least one intermediate lever 27 via an adjustable force linkage point 28.

The transfer mechanism 26 comprises a pressure piece 29 and at least one positioning contour 30, on which the at least one pressure piece 29 can be displaceably supported. The at least one pressure piece 29 is arranged on the at least one intermediate lever 27 of the transfer mechanism 26, and the at least one positioning contour 30 is arranged on the actuating arm 5, or vice versa.

The furniture drive 1 can also comprise a damper 48, with which a movement of the actuating arm 5 in the opening and/or closing direction can be damped.

Figure 5B:
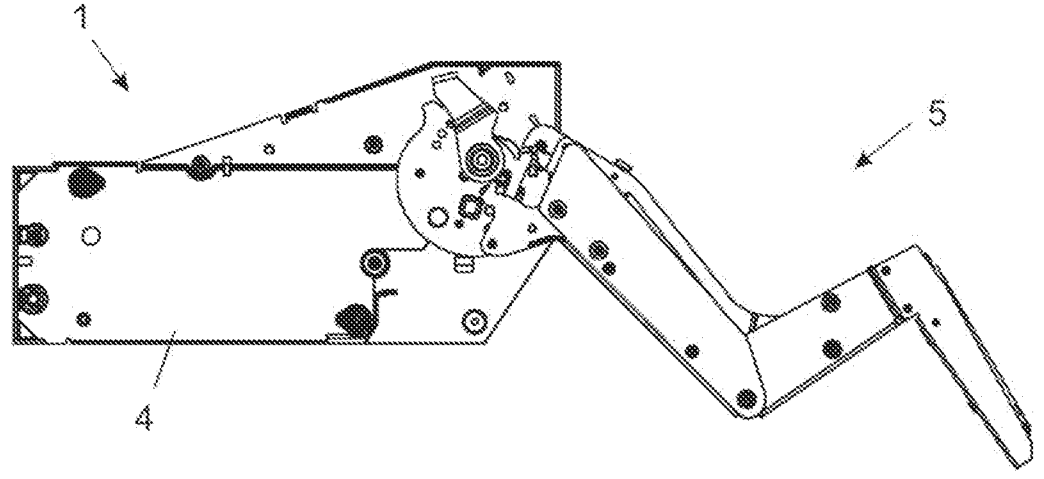
Figure 5C:
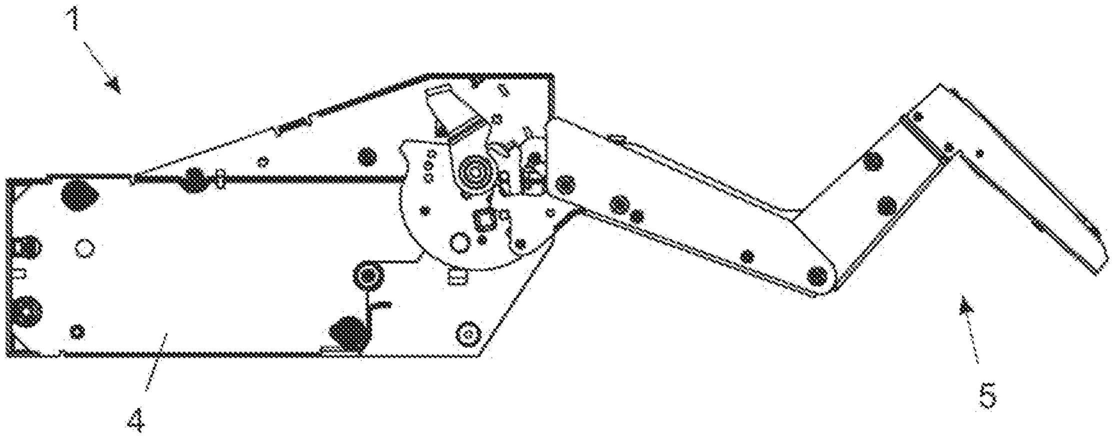
Figure 5D:
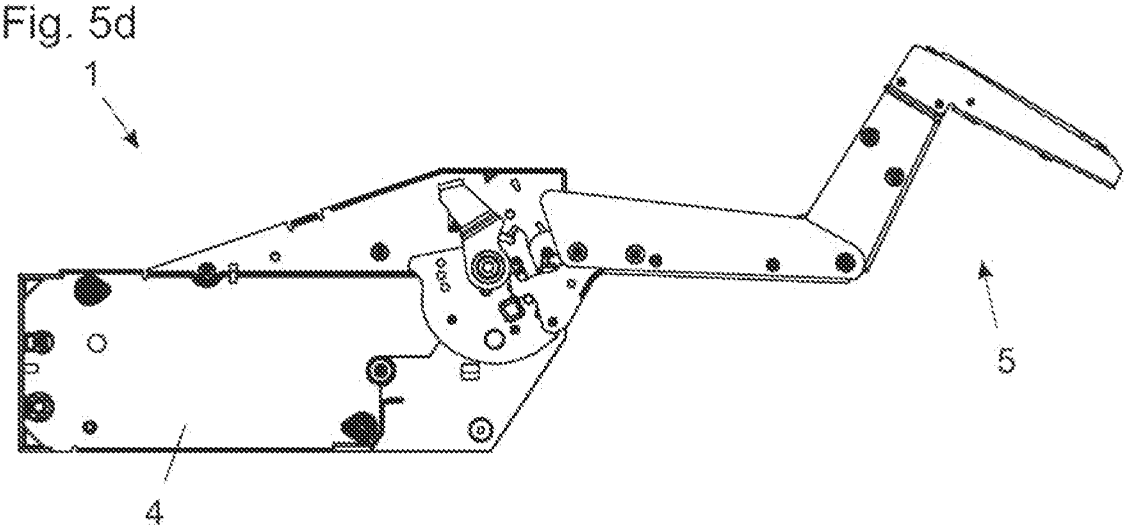
Figure 5E:
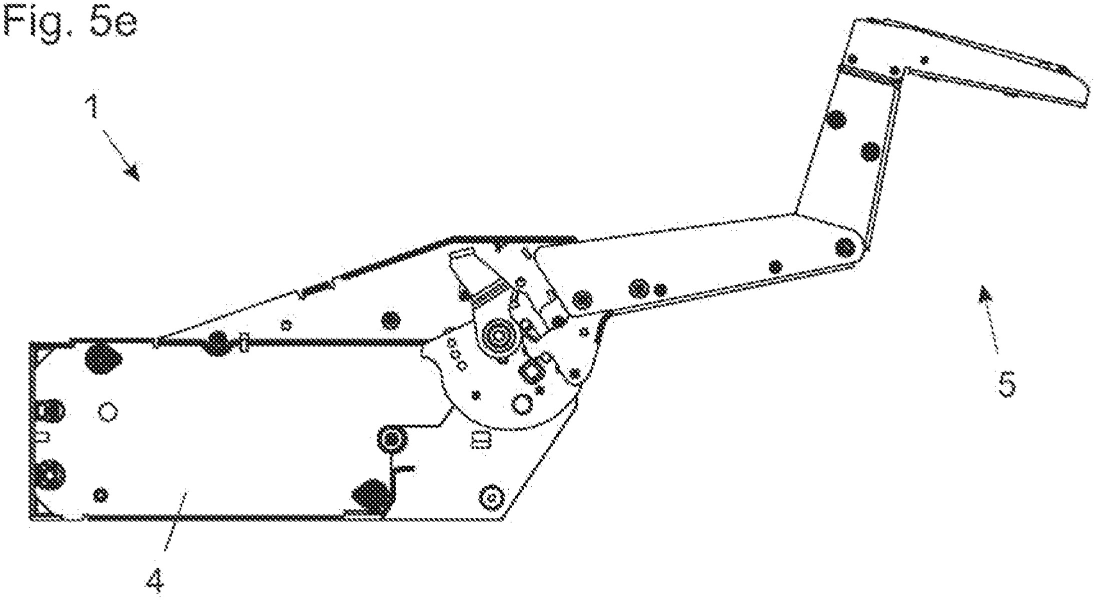

FIGS. 5*a*-5*e* show the embodiment of the furniture drive 1, wherein the actuating arm 5 is arranged in different rotational positions relative to the main body 4, between a first rotational position, which corresponds to a closed position of the furniture front part 2 that can be fastened to the actuating arm 5 (partial figure a), and a second rotational position, which corresponds to a maximum open position of the furniture front part 2 that can be fastened to the actuating arm 5 (partial figure e). Partial FIGS. 5*b*, 5*c* and 5*d* show intermediate rotational positions.

Figure 6A:
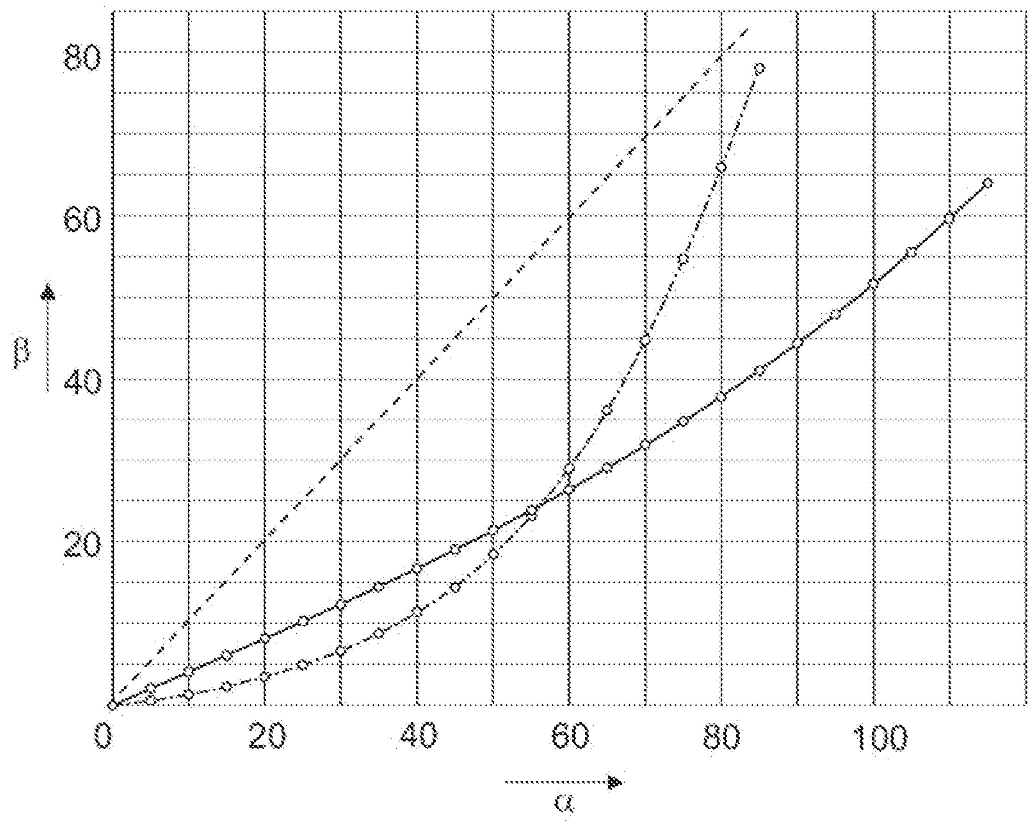
FIGS. 6*a*, 6*b* are graphs which show the progression of the front part angle $\beta$ (partial figure a) and the gradient $f'(\alpha)$ (partial figure b) against the rotational angle $\alpha$, namely of a furniture drive or of a piece of furniture according to the state of the art (dot-dash lines) and of a furniture drive according to the invention or of a piece of furniture according to the invention (continuous lines), wherein the curves of a furniture fitting with a 1-pivot point linkage are drawn in as a comparison (dashed lines)

If the front part angle $\beta$ is plotted as a function of the rotational angle $\alpha$, then the progression represented in FIG. 6*a* results (continuous line). The progression of the front part angle $\beta$ of the furniture drive 101 known from the state of the art (dot-dash line) and the curves of a furniture drive with a 1-pivot point linkage (dashed lines) are represented in comparison to that.

Figure 6B:
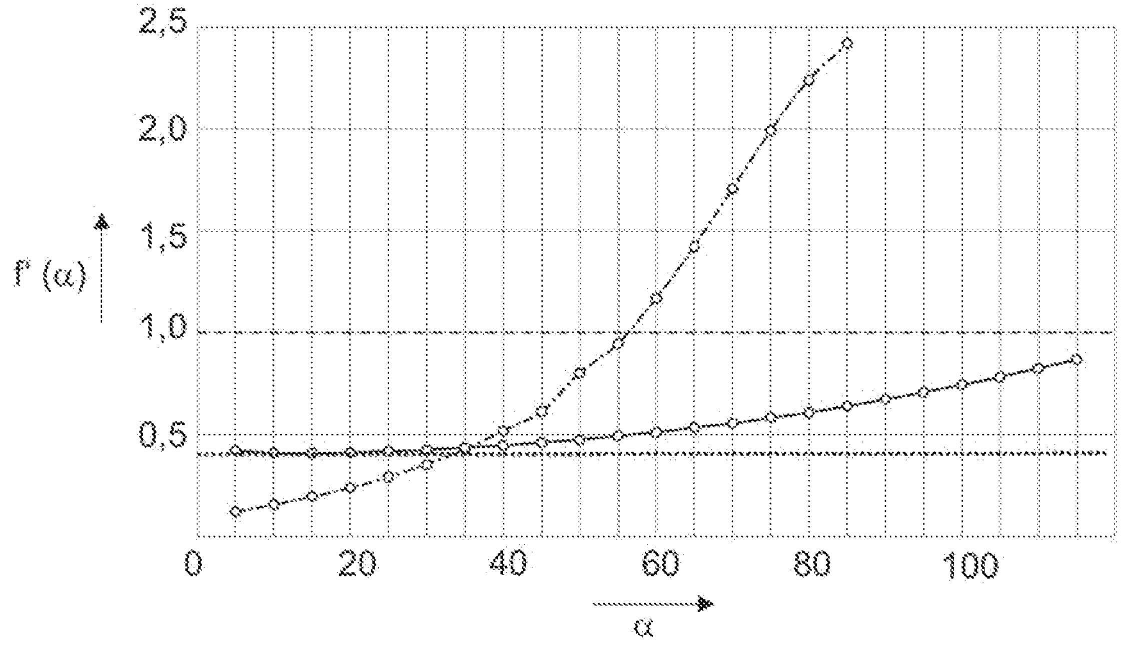

If the derivative f' ($\alpha$) is calculated in each case and plotted against the rotational angle $\alpha$, then the progressions represented in FIG. 6*b* result.

In the case of a furniture drive with a 1-pivot point linkage, the gradient is 1 at every point. In the case of the furniture drive 101 known from the state of the art, the front part angle $\beta$ initially changes gradually and then increasingly sharply. In comparison to that, in the case of the furniture drive 1 the front part angle $\beta$ changes comparatively sharply even at the beginning of the opening movement. This is realized in technical terms in that the levers 7, 8, 9 of the actuating arm 5, or the four pivot points of the four-pivot point geometry of the levers 7, 8, 9 of the actuating arm 5, are arranged relative to one another such that a gradient f' ($\alpha$) of the function f is greater than 0.2, preferably greater than 0.3, at least over a rotational angle range of the actuating arm 5 between 0° and 25°, preferably over the whole rotational angle range of the actuating arm 5.

If the stabilities of the furniture drive with a 1-pivot point linkage, the furniture drive 101 known from the state of the art and a furniture drive 1 according to the invention are now compared, it can thus be established that the furniture drive with a 1-pivot point linkage is the most stable solution and the furniture drive 101 known from the state of the art is the least stable solution, which requires a synchronization mechanism. It has now been found, surprisingly for a person skilled in the art, that furniture drives 1 in which a gradient f' ($\alpha$) of the function f is greater than 0.2, preferably greater than 0.3, at least over a rotational angle range of the actuating arm 5 between 0° and 25°, preferably over the whole rotational angle range of the actuating arm 5, already have a sufficiently high stability which makes it possible to dispense with the use of a synchronization mechanism separate from the furniture front part. In the specifically represented case, the gradient f' ($\alpha$) of the function f is above 0.4 in the whole rotational angle range of the actuating arm 5.

Figure 7:
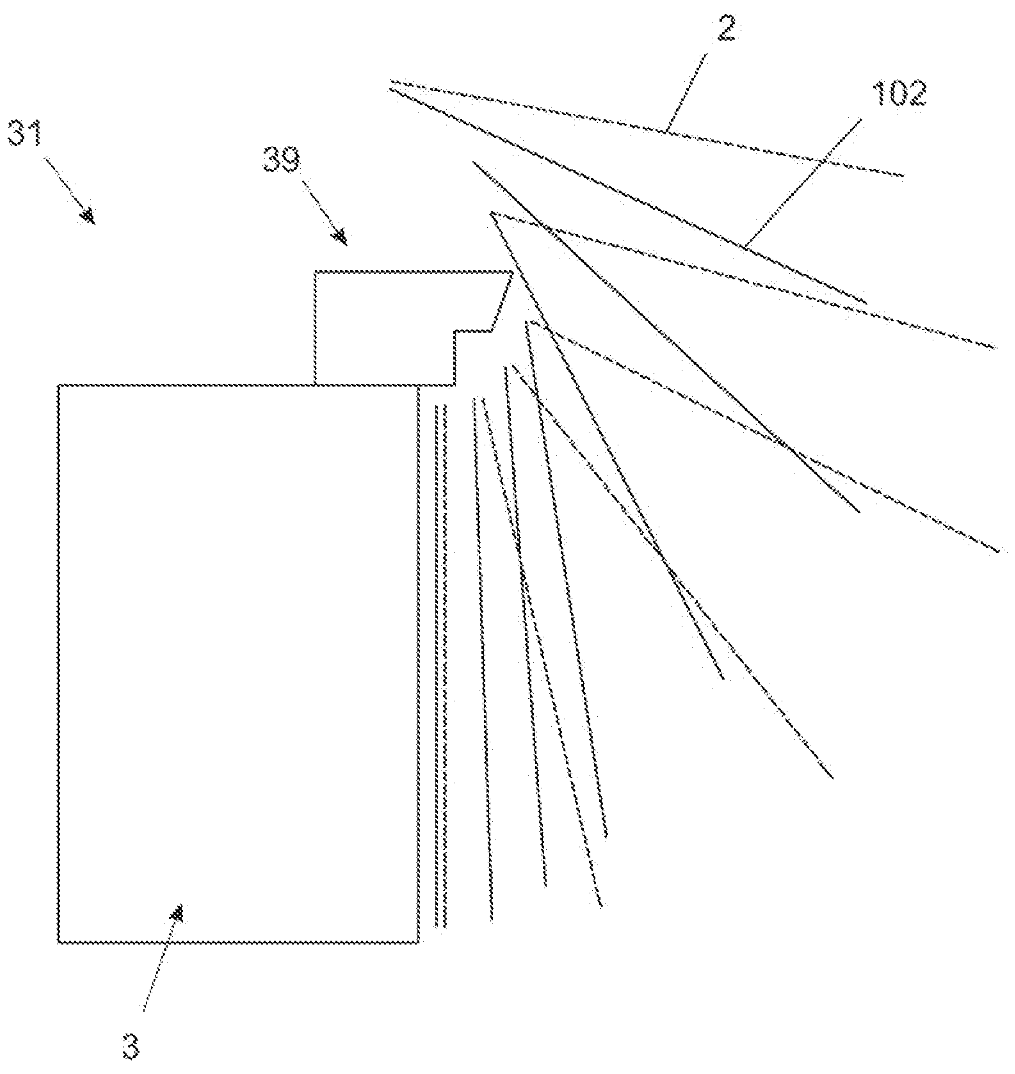
FIG. 7 is a comparative representation of the positions of the furniture front part relative to the furniture carcass of a piece of furniture according to the state of the art (continuous lines) and a piece of furniture according to the invention (dashed lines) in a schematically represented overlaid top view from the side.
Figure 8A:
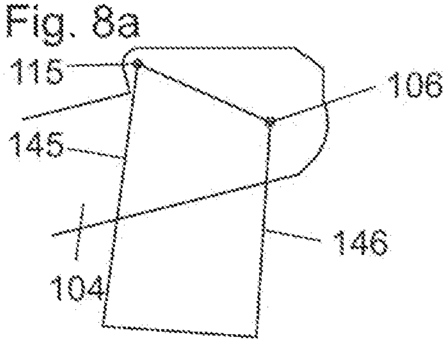
FIGS. 8*a*-8*f* are a sequence of abstracted schematic representations of the lever arms of a furniture drive according to the state of the art, wherein partial figure a corresponds to the first rotational position of the actuating arm and partial figure f corresponds to the second rotational position of the actuating arm.
Figure 8B:
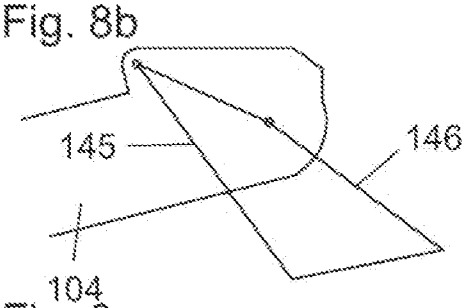
Figure 8C:
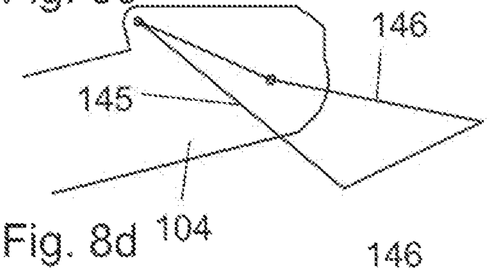
Figure 8D:
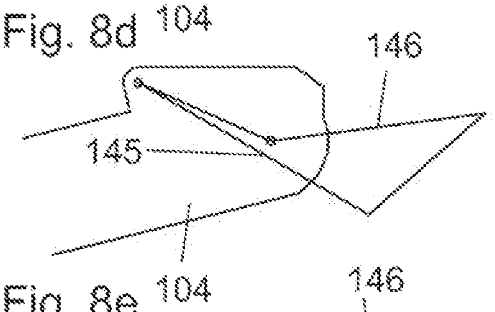
Figure 8E:
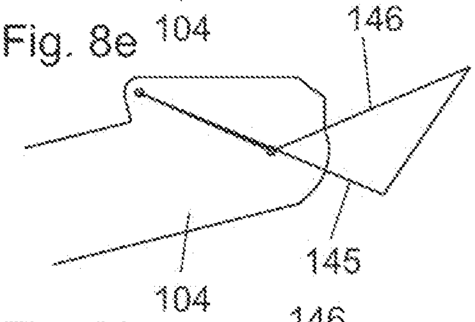
Figure 8F:
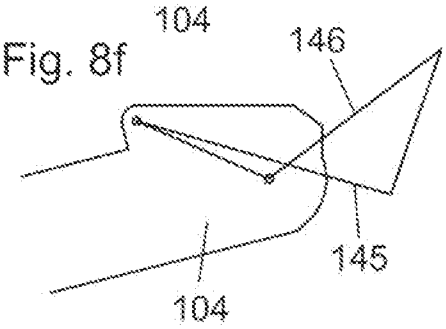

FIG. 7 shows a comparative representation of the position of the furniture front parts 2 and 102 relative to the furniture carcass of a piece of furniture according to the state of the art (continuous lines) and a piece of furniture 31 according to the invention (dashed lines). It can be clearly seen that, in the case of the piece of furniture 31 according to the invention, the furniture front part 2 starts to rotate immediately at the beginning of the opening movement, whereas, in the case of the state of the art, the furniture front part is initially moved substantially parallel away from the front face of the furniture carcass. The cornice 39 is circumnavigated in both cases.

FIGS. 8*a* to 8*f* and 9*a* to 9*f*, in a comparison, show, on the one hand, the movement of the lever arms 145 and 146 in the case of a furniture drive 101 according to the state of the art and, on the other hand, the lever arms 45 and 46 in the case of a preferred embodiment of the furniture drive 1 according to the invention in the course of an opening movement starting from the closed position represented in partial figure a, i.e. the first rotational position of the actuating arm 5, up until the maximum open position represented in partial figure f, i.e. the second rotational position of the actuating arm 5.

It can be established that a dead center of the lever geometry is crossed at an earlier point in time in the course of the opening movement in the case of the furniture drive 101.

Figure 9A:
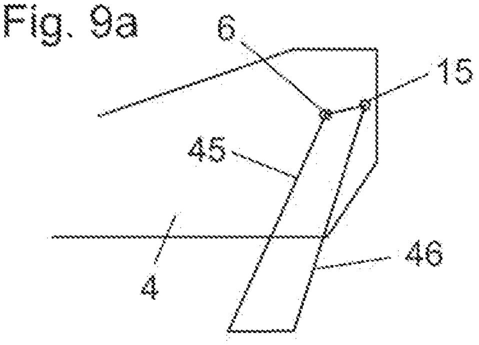
FIGS. 9*a*-9*f* are a sequence of abstracted schematic representations of the lever arms of a furniture drive according to the invention, wherein partial figure a corresponds to the first rotational position of the actuating arm and partial figure f corresponds to the second rotational position of the actuating arm.
Figure 9B:
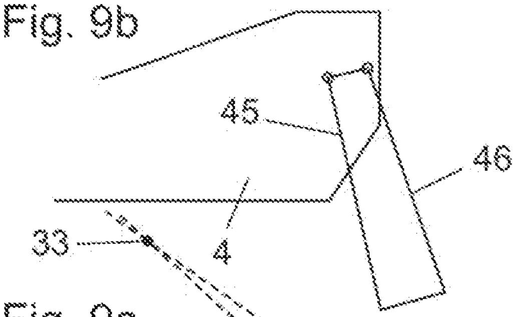
Figure 9C:
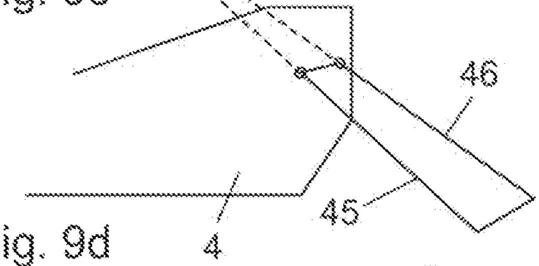
Figure 9D:
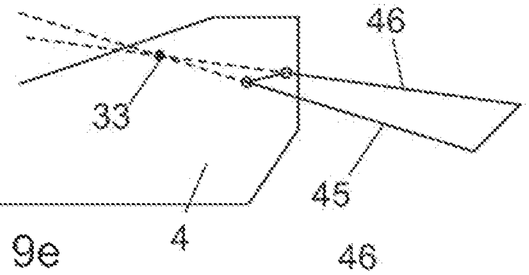
Figure 9E:
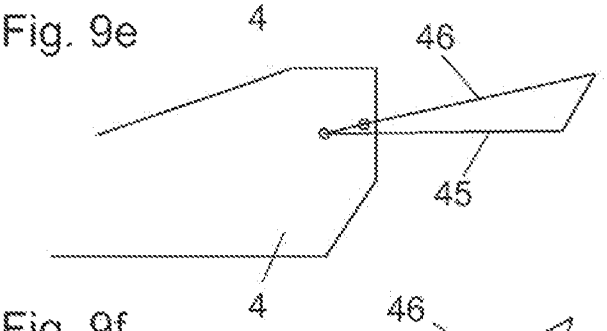
Figure 9F:
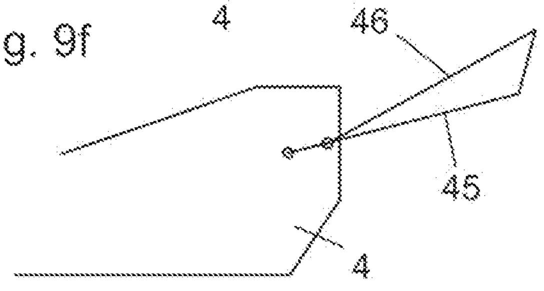

In FIGS. 9*c* and 9*d*, the instantaneous center of rotation of the lever geometry is represented in space by way of example from the point of intersection of the two lever arms 45 and 46. If the instantaneous center of rotation is plotted for each rotational position of the furniture drive 1 and 101, then the curves 134 and 34 represented in FIGS. 10*a* (for the furniture drive 101) and 10*b* (for the furniture drive 1) result.

Figure 10A:
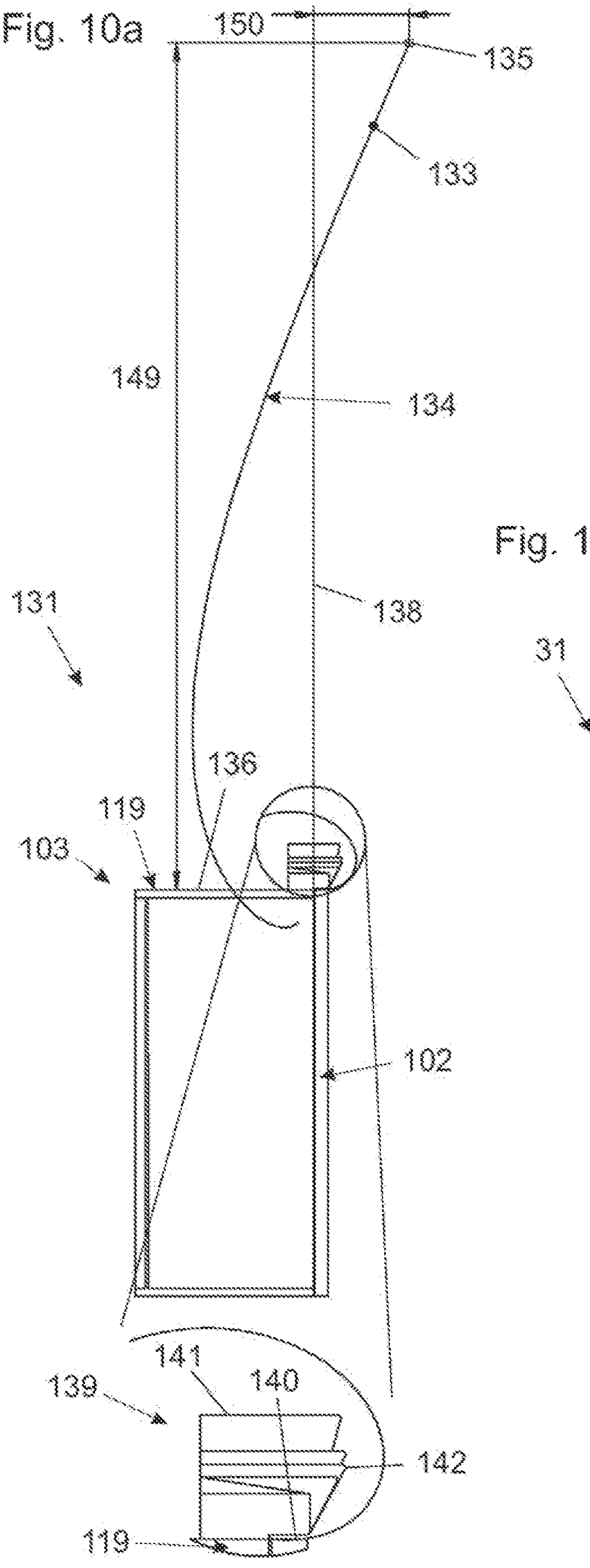
FIG. 10*a* shows a piece of furniture according to the state of the art together with the progression of the instantaneous center of rotation in a schematic cross-sectional view from the side, wherein the circumnavigation of the cornice is represented in the enlarged partial view.
Figure 10B:
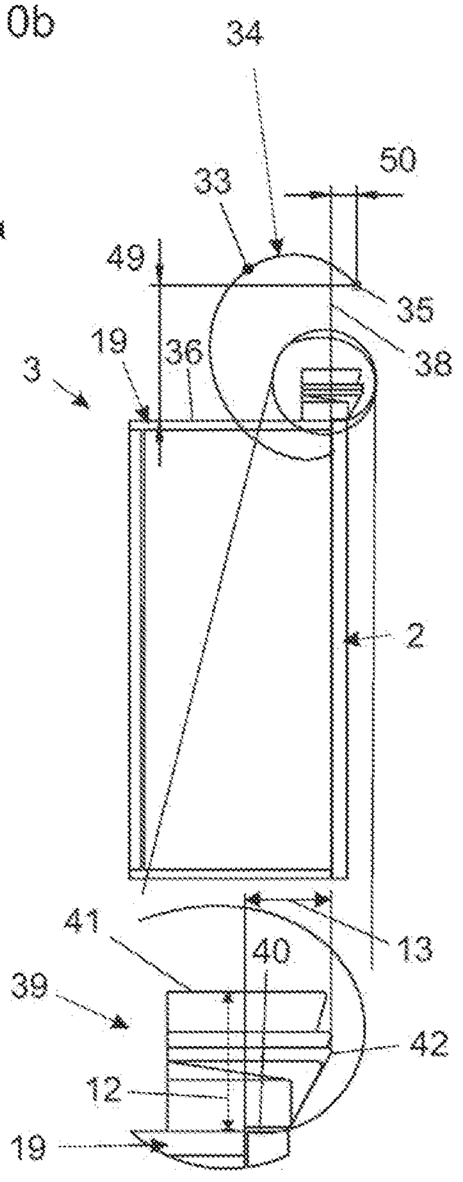
FIG. 10*b* shows a piece of furniture according to the invention together with the progression of the instantaneous center of rotation in a schematic cross-sectional view from the side, wherein the circumnavigation of the cornice is represented in the enlarged partial view.

It emerges from FIG. 10*b* that the instantaneous center of rotation 33 of the furniture front part 2 or of the lever arrangement of the levers 7, 8, 9 of the actuating arm 5 can be moved along an imaginary curve 34 in space relative to the furniture carcass 3 when the furniture front part 2 is moved between the closed position and the maximum open position. The furniture carcass 3 has a top panel 19, and an end point 35 of the curve 34 of the instantaneous center of rotation 33, which corresponds to the closed position, is less than 500 mm, preferably less than 250 mm, away from a top side 36 of the top panel 19 (drawn in as distance 49 in the figure). The furniture carcass 3 also has a front face 37 that faces the furniture front part 2 in the closed position, and an end point 35 of the curve 34 of the instantaneous center of rotation 33, which corresponds to the closed position, is less than 75 mm, preferably less than 50 mm, away from an imaginary extension (i.e., a plane) 38 of the front face 37 upwards beyond (above) the furniture carcass 3 (drawn in as distance 50 in the figure).

In comparison to that, the distance 149 of the end point 135 of the curve 134 of the instantaneous center of rotation 133 from the top side 136 of the top panel 119 of the piece of furniture 131 in the case of the furniture drive 101 is approx. 1700 mm and the distance 150 from the imaginary extension 138 is approx. 190 mm and thus much greater, which results in an unstable arrangement, which needs to be stabilized with a synchronization rod.

In the enlarged partial views of FIGS. 10*a* and 10*b*, the circumnavigation of the cornices 139 and 39 is additionally represented.

The furniture carcass 3 of the piece of furniture 31 comprises a cornice 39, wherein, in the case of a movement between the closed position and the maximum open position, the furniture front part 2 can be moved unhindered around the cornice 39 without an upper edge 40 of the furniture front part 2 that faces the cornice 39 in the closed position colliding with the cornice 39. Preferably, the furniture carcass 3 has a top panel 19, and a top side 41 of the cornice 39 is between 75 mm and 100 mm away from the top side 36 of the top panel 19 (drawn in as distance 12 in the figure), and/or the furniture carcass 3 has a front face 37 that faces the furniture front part 2 in the closed position, and a front side 42 of the cornice 39 is between 40 and 75 mm away from an imaginary extension 38 of the front face 37 upwards beyond the furniture carcass 3 (drawn in as distance 13 in the figure).

In FIG. 10*a*, the edge of the furniture front part 102 is provided with the reference number 140, the top side of the cornice 139 is provided with the reference number 141 and the front side of the cornice 139 is provided with the reference number 142.

No piece of furniture is known from the state of the art which fulfils both conditions, namely on the one hand a curve 34 of the instantaneous center of rotation 33 arranged very close to the fixed pivot points of the furniture drive 1 and, on the other hand, the possibility to circumnavigate an optionally present cornice 39 without colliding.

The invention claimed is:

1. A furniture drive for moving a furniture front part relative to a furniture carcass, the furniture drive comprising:

a main body to be fastened to the furniture carcass; and an actuating arm rotatable about a first axis of rotation on the main body, the actuating arm including:

a plurality of levers connected to each other in an articulated manner, a fastening interface arranged to lie within an imaginary fastening interface plane and configured to allow the furniture front part to be fastened to the actuating arm, wherein the actuating arm is movable continuously with respect to the first axis of rotation between a first rotational position, corresponding to a closed position of the furniture front part to be fastened to the actuating arm and in which a first one of the plurality of levers forms a rotational angle α of 0°, and a second rotational position corresponding to a maximum open position of the furniture front part to be fastened to the actuating arm and in which the first one of the plurality of levers forms a rotational angle α greater than 0°, wherein the actuating arm is configured such that, during a rotational movement of the actuating arm, the fastening interface plane and the furniture front part to be fastened to the actuating arm pass through different front part angles β, each front part angle β being an angle formed between the imaginary fastening interface plane and a front face of the furniture carcass, and wherein each rotational angle α of the actuating arm is assigned a front part angle β=f (α) of the fastening interface plane using a function f, beginning with a front part angle β of 0°, which is assigned to the rotational angle α of the actuating arm of 0°, and wherein the plurality of levers of the actuating arm are arranged relative to one another such that a gradient f' (α) of the function f is greater than 0.2 over a rotational angle range of the actuating arm between 0° and 25°.

2. The furniture drive according to claim 1, wherein the plurality of levers of the actuating arm form a four-pivot point geometry, wherein a first pivot point of the four-pivot point geometry corresponds to the first axis of rotation of the actuating arm, and all four pivot points of the four-pivot point geometry of the plurality of levers of the actuating arm are arranged relative to one another such that a gradient f' (α) of the function f is greater than 0.2 over a rotational angle range of the actuating arm between 0° and 25°.

3. The furniture drive according to claim 2, wherein the four pivot points of the four-pivot point geometry of the plurality of levers of the actuating arm are arranged relative to one another such that a gradient f' (α) of the function f is greater than 0.3 over an entire rotational angle range of the actuating arm.

4. The furniture drive according to claim 1, wherein the actuating arm is mounted rotatable about a second axis of rotation on the main body, and wherein the furniture drive is configured to have at least one of:

the main body of the furniture drive has a front opening through which the actuating arm at least partially protrudes in the maximum open position, the second axis of rotation is located a smaller normal distance from the front opening than is the first axis of rotation, and/or the main body of the furniture drive has a top side facing a top panel of the furniture carcass when the furniture drive is fastened to the furniture carcass, and the second axis of rotation is located a smaller normal distance from the top side than is the first axis of rotation.

5. The furniture drive according to claim 4, wherein the second axis of rotation corresponds to a pivot point of the four-pivot point geometry of the plurality of levers of the actuating arm.

6. The furniture drive according to claim 1, wherein the plurality of levers of the actuating arm comprise:

at least three levers connected to each other in an articulated manner, and/or an angled lever, and/or at least two levers nested in one another in at least one rotational position with the result that the two levers are formed substantially gap-free in a top view from the side, and/or a first lever having a U-shaped cross section and a second lever at least partially arranged between the vertical legs of the U-shaped first lever.

7. The furniture drive according to claim 6, wherein the plurality of levers of the actuating arm comprise:

an angled lever having two sections forming an angle of substantially 90° relative to one another, and/or at least two levers nested in one another in every rotational position of the actuating arm, with the result that the two levers are formed substantially gap-free in a top view from the side.

8. The furniture drive according to claim 1, wherein the plurality of levers of the actuating arm comprise a first lever and a second lever, via which the actuating arm is rotatably connected to the main body, and a third lever, on which the fastening interface is formed first lever and the second lever are connected to the third lever in an articulated manner.

9. The furniture drive according to claim 1, wherein at least one of the plurality of levers of the actuating arm is to be detachably connected to the main body.

10. The furniture drive according to claim 9, wherein at least two of the plurality of levers of the actuating arm are to be detachably connected to the main body.

11. The furniture drive according to claim 1, further comprising an energy storage mechanism configured to apply a force to the actuating arm to compensate for a weight of the furniture front part to be fastened to the actuating arm.

12. The furniture drive according to claim 11, wherein the energy storage mechanism includes a spring element and is mounted on the main body.

13. The furniture drive according to claim 11, further comprising a transfer mechanism configured to transfer a force to be stored in the energy storage mechanism to the actuating arm.

14. The furniture drive according to claim 13, wherein the transfer mechanism comprises:

an intermediate lever connected to the energy storage mechanism via an adjustable force linkage point, and/or a pressure piece and a positioning contour on which the pressure piece is displaceably supported, the pressure piece being arranged on an intermediate lever of the transfer mechanism, and the positioning contour being arranged on the actuating arm, or vice versa.

15. A piece of furniture comprising:

a furniture carcass, a furniture front part, and the furniture drive according to claim 1, wherein the main body of the furniture drive is fastened to the furniture carcass, and the furniture front part is fastened to the actuating arm of the furniture drive via the fastening interface.

16. The piece of furniture according to claim 15, wherein the furniture drive is a first furniture drive, the piece of furniture further comprising a second furniture drive connected to the furniture carcass and the furniture front part, and the first furniture drive and the second furniture drive being connected to each other only via the furniture front part and the furniture carcass.

17. The piece of furniture according to claim 15, wherein an instantaneous center of rotation of the furniture front part is movable along an imaginary curve relative to the furniture carcass when the furniture front part is moved between the closed position and the maximum open position, and wherein:

the furniture carcass has a top panel, and an end point of the imaginary curve of the instantaneous center of rotation corresponding to the closed position is less than 500 mm away from a top side of the top panel, and/or the furniture carcass has a front face facing the furniture front part in the closed position, and an end point of the curve of the instantaneous center of rotation corresponding to the closed position; is less than 75 mm away from an imaginary plane of the front face extending upwards above the furniture carcass.

18. The piece of furniture according to claim 17, wherein:

the end point of the imaginary curve of the instantaneous center of rotation corresponding to the closed position is less than 250 mm away from a top side of the top panel, and/or the end point of the imaginary curve of the instantaneous center of rotation corresponding to the closed position is less than 50 mm away from an imaginary extension of the front face upwards beyond the furniture carcass.

19. The piece of furniture according to claim 15, wherein the furniture carcass comprises a cornice, and, during a movement between the closed position and the maximum open position, the furniture front part is movable unhindered around the cornice without an upper edge of the furniture front part facing the cornice in the closed position colliding with the cornice.

20. The piece of furniture according to claim 19, wherein:

the furniture carcass has a top panel, and a top side of the cornice is between 75 mm and 100 mm away from the top side of the top panel, and/or the furniture carcass has a front face facing the furniture front part in the closed position, and a front side of the cornice is between 40 mm and 75 mm away from an imaginary plane of the front face extending upwards above the furniture carcass.

21. The piece of furniture according to claim 15, wherein the furniture carcass has a front face facing the furniture front part in the closed position, and wherein, in the closed position, the furniture front part has a front part angle β of 0° relative to the front face.

22. The piece of furniture according to claim 21, wherein, in the maximum open position, the furniture front part has a front part angle β of between 60° and 80° relative to the front face.

23. A method for moving the furniture front part relative to the furniture carcass of the piece of furniture according to claim 15, comprising:

moving the furniture front part, starting from the closed position, in a direction of the maximum open position, and vice versa, wherein the furniture carcass comprises a cornice, the moving of the furniture front part between the closed position and the maximum open position comprises moving the furniture front part unhindered around the cornice without an upper edge of the furniture front part facing the cornice in the closed position colliding with the cornice.

24. The piece of furniture according to claim 15, wherein the main body of the furniture drive is fastened to a side wall of the furniture carcass.

25. The furniture drive according to claim 1, wherein the plurality of levers of the actuating arm are arranged relative to one another such that a gradient f' (α) of the function f is greater than 0.3 over an entire rotational angle range of the actuating arm.

26. A piece of furniture comprising:

a furniture carcass, a furniture front part, and the furniture drive according to claim 1, wherein the main body of the furniture drive is fastened to the furniture carcass, and the furniture front part is fastened to the actuating arm of the furniture drive via the fastening interface, wherein an instantaneous center of rotation of the furniture front part is movable along an imaginary curve relative to the furniture carcass when the furniture front part is moved between the closed position and the maximum open position furniture carcass has a top panel, and an end point of the curve of the instantaneous center of rotation corresponding to the closed position; is less than 500 mm away from a top side of the top panel, and/or the furniture carcass has a front face facing the furniture front part in the closed position, and an end point of the curve of the instantaneous center of rotation corresponding to the closed position; is less than 75 mm away from an imaginary plane of the front face extending upwards above the furniture carcass, and wherein the furniture carcass comprises a cornice, and, in the case of a movement between the closed position and the maximum open position, the furniture front part is movable unhindered around the cornice without an upper edge of the furniture front part facing the cornice in the closed position colliding with the cornice.

27. The piece of furniture according to claim 26, wherein the furniture drive is a first furniture drive, the piece of furniture further comprising a second furniture drive connected to the furniture carcass and the furniture front part, wherein the first furniture drive and the second furniture drive are connected to each other only via the furniture front part and the furniture carcass.

28. The piece of furniture according to claim 26, wherein the main body of the furniture drive is fastened to a side wall of the furniture carcass, wherein the end point of the curve of the instantaneous center of rotation corresponding to the closed position is less than 250 mm away from the top side of the top panel, and/or the end point of the curve of the instantaneous center of rotation corresponding to the closed position is less than 50 mm away from the imaginary plane of the front face extending upwards above the furniture carcass, and wherein the furniture carcass has a top panel, and a top side of the cornice is between 75 and 100 mm away from the top side of the top panel, and/or the furniture carcass has a front face facing the furniture front part in the closed position, and a front side of the cornice is between 40 and 75 mm away from the imaginary plane of the front face extending upwards above the furniture carcass.

* * * * *